Patented Oct. 24, 1933

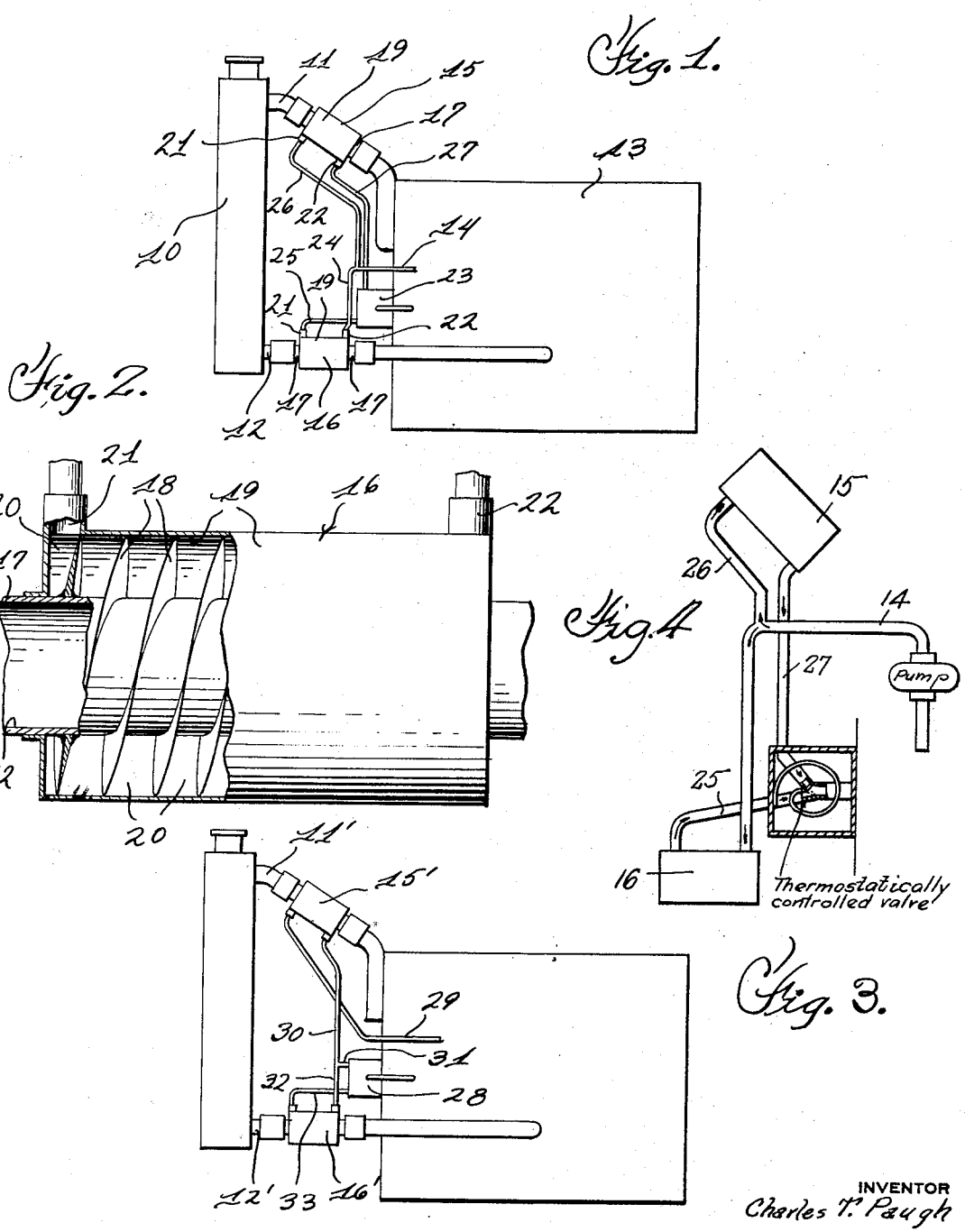

1,931,935

UNITED STATES PATENT OFFICE 1,931,935

SYSTEM OF COOLING AND HEATING OIL

Charles T. Paugh, Detroit, Mich., assignor to Wolverine Tube Company, Detroit, Mich., a corporation of Michigan Application April 6, 1931. Serial No. 528,183

2 Claims. (Cl. 123—196)

This invention relates to a fluid temperature control system and more especially to a system for automatically cooling and heating a fluid such as oil, the system being particularly adapted for use in connection with motor vehicles and the like.

My improved temperature control system is adapted for use in combination with the circulatory water cooling system of motor vehicles and the like and contemplates the use of heat exchange devices associated with the hot water intake and the cool water outlet of the usual motor vehicle radiator together with a thermostatically controlled valve and a system of conduits whereby through the medium of the valve, the oil from the usual oil pump may be circulated through the heat exchange devices in such a manner as to properly control the temperature of the oil.

The several objects, advantages and novel details of construction will be made more apparent as this description proceeds, especially when considered in connection with the accompanying drawing, wherein Figure 1 is a semi-diagrammatic sectional elevational view showing my improved system as used in combination with a motor vehicle power unit, circulatory cooling system and oil circulatory system;

Figure 2 is a sectional elevational view through one of the heat exchange devices, Figure 3 is a view similar to Figure 1 showing a modified form of construction, and Figure 4 is a semi-diagrammatic view of a portion of the system showing the thermostatically controlled valve and pump connected with the system of conduits.

Referring now more especially to Figure 1, it will be noted that there is diagrammatically illustrated a radiator 10 of the usual type employed with circulatory water cooling systems for the engines of motor vehicles and the like, the radiator being provided with the customary hot water inlet 11 and the customary cool water outlet 12. The reference character 13 indicates diagrammatically the power unit or motor which is provided with an oil pump (not shown) from the pressure side of which a conduit 14 extends.

The reference characters 15 and 16 indicate heat exchange devices which obviously may be of any preferred or desired construction but are preferably of a construction shown and described in my copending application, Serial No. 528,182 and shown in detail in Figure 2 of this application.

As illustrated in Figure 2 each of these heat exchange devices comprises a tube 17 provided with fins 18 extending through a housing 19, the finned tube cooperating with the housing to form a helical passage 20 therethrough. Inlet and outlet connections 21 and 22 are provided through the housing 19 for the helical passage 20. One of these heat exchange devices is associated with the hot water intake 11 of the radiator and one with the cool water outlet 12 of the radiator so that hot water passing through the inlet 11 flows through the tube 17 of the heat exchange device 15 and the cooled water passing through the outlet conduit 12 flows through the tube 12 of the heat exchange device 16. The oil is conducted through the helical passage 20 of each of these heat exchange devices.

The reference character 23 indicates a thermostatically controlled valve of any preferred or desired construction operated in dependence upon the temperature of the oil or the engine or both, there being provided a system of conduits whereby the oil may be caused to flow through either of the heat exchange devices 15 or 16. As will be observed, there is a conduit 24 leading from the pressure conduit 14 to one end of the heat exchange device 16 and a conduit 25 leading from the other end of this heat exchange device back to the valve device 23 and thence to the motor so that the oil is conducted to the bearings and other parts to be lubricated. Another conduit 26 extends from the pressure conduit 14 to the inlet end of the heat exchange device 15 and a conduit 27 extends from the other end of this heat exchange device back to the valve device 23 and thence to the motor.

When the lubricant or oil is hot the thermostat operates the valve to cause a flow of the lubricant from the pressure conduit 14 of the oil pump through the conduit 24 to the heat exchange device 16. The oil then flows through the helical passageway 20 and then through the conduit 25 back to the bearings to be lubricated. In this heat exchange device the cool water from the radiator flows through the tube 17 and acts to effectively reduce the temperature of the oil as will be obvious. When the oil is cold the thermostatically controlled valve 23 operates to cause the oil to flow from the oil pressure supply conduit 14 through conduit 26 to the heat exchange device 15 and then through the conduit 27 to the bearings to be lubricated in this latter heat exchange device, the hot water flowing to the top of the radiator passes through the tube 17 and acts to raise the temperature of the oil flowing through the helical passageway of this heat exchange device.

It is understood that the thermostatically controlled valve device 23 is on the return side of the system and that the pressure side is represented by the conduits 14, 24 and 26. Thus while both the heat exchange devices are normally filled with oil from the pressure side of the system, the circulation through one or the other of the heat exchange devices 15 and 16 is controlled by the operation of the valve device 23.

With this construction it is possible to control to an efficient degree, the temperature of the lubricating oil.

The use of this type of heat exchange device is particularly advantageous in view of the high degree of efficiency thereof and as a consequence of this construction the heat exchange devices may be relatively small and compact and still act to effectively heat or cool the oil as the case may be.

In Figure 3 a slightly modified form of construction is illustrated in which a heat exchange device 15' is associated with the hot water intake 11' and an oil cooling heat exchange device 16' is associated with the cooled water discharge conduit 12'. The construction of the heat exchange devices 15' and 16' are similar to the heat exchange devices 15 and 16 previously described. The thermostatically controlled valve 28 acts to direct the oil which has first come through conduit 29, heat exchange device 15' and conduit 30, either direct through conduit 31 to the motor and parts to be lubricated, when oil is not too hot, or through conduit 32, heat exchange device 16' and conduit 33 when oil requires cooling. In the circuit last described the oil flows through both heat exchange devices but when oil temperature from the motor is higher than water temperature in heat exchange device 15', it acts as a preliminary cooler.

Various modifications and changes in the herein described structure are contemplated and reservation is made to make such changes as may come within the purview of the accompanying claims.

What I claim as my invention is:

1. In a temperature control system for motor vehicles and the like the combination of, a radiator having inlet and outlet connections, an oil pump, a heat exchange device connected respectively with each of said inlet and outlet connections, a thermostatically controlled valve, and means controlled by said valve for directing oil from said pump to said heat exchange devices.

2. In an oil temperature control system for motor vehicles and the like the combination of, a radiator forming a part of the cooling system of the motor vehicle and having inlet and outlet connections, an oil pump forming a part of the oil circulatory system of the motor vehicle, heat exchange devices connected respectively with said inlet and outlet connections, a thermostatically controlled valve, and means controlled by said valve for directing oil from said pump to either of said heat exchange devices.

CHARLES T. PAUGH.